(12) United States Patent
Han et al.

(10) Patent No.: US 11,902,959 B2
(45) Date of Patent: Feb. 13, 2024

(54) ENHANCED SCHEDULING OF TIME SENSITIVE NETWORKING

(71) Applicant: LENOVO (BEIJING) LIMITED, Beijing (CN)

(72) Inventors: Jing Han, Beijing (CN); Haiming Wang, Beijing (CN); Lianhai Wu, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 374 days.

(21) Appl. No.: 17/425,922

(22) PCT Filed: Feb. 2, 2019

(86) PCT No.: PCT/CN2019/074615
§ 371 (c)(1),
(2) Date: Jul. 26, 2021

(87) PCT Pub. No.: WO2020/155149
PCT Pub. Date: Aug. 6, 2020

(65) Prior Publication Data
US 2022/0304010 A1 Sep. 22, 2022

(51) Int. Cl.
*H04W 72/1263* (2023.01)
*H04W 72/0446* (2023.01)
(Continued)

(52) U.S. Cl.
CPC ... *H04W 72/1263* (2013.01); *H04W 72/0446* (2013.01); *H04W 72/23* (2023.01); *H04W 72/543* (2023.01)

(58) Field of Classification Search
None
See application file for complete search history.

(56) References Cited

U.S. PATENT DOCUMENTS

| | | | |
|---|---|---|---|
| 11,770,816 B2 * | 9/2023 | Bush | H04L 5/0012 370/330 |
| 2018/0006955 A1 | 1/2018 | Bush et al. | |

(Continued)

FOREIGN PATENT DOCUMENTS

| | | |
|---|---|---|
| WO | 2018191447 A1 | 10/2018 |
| WO | 2018200038 A1 | 11/2018 |

OTHER PUBLICATIONS

Internation Searching Authority, "Written Opinion of the International Searching Authority," PCT/CN2019/074615, dated Oct. 30, 2019, pp. 1-4.

(Continued)

*Primary Examiner* — Otis L Thompson, Jr.
(74) *Attorney, Agent, or Firm* — Kunzler Bean & Adamson

(57) ABSTRACT

Method and apparatus for enhanced scheduling of Time Sensitive Networking (TSN) in NR IIoT are disclosed. The method include: transmitting, by a remote device, a Time Sensitive Networking (TSN) traffic pattern to a base station; and configuring scheduling of TSN transmissions between the remote device and the base station based on a TSN traffic configuration; wherein the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

20 Claims, 7 Drawing Sheets

---

902
Transmitting a Time Sensitive Networking (TSN) traffic pattern to a base station

↓

904
Configuring scheduling of TSN transmissions between the remote device and the base station based on a TSN traffic configuration

(51) Int. Cl.
*H04W 72/23* (2023.01)
*H04W 72/543* (2023.01)

(56) References Cited

U.S. PATENT DOCUMENTS

| | | | |
|---|---|---|---|
| 2018/0227067 A1* | 8/2018 | Hu | H04J 3/0691 |
| 2020/0059829 A1* | 2/2020 | Joseph | H04W 36/08 |
| 2020/0120536 A1* | 4/2020 | Prakash | H04W 72/21 |
| 2021/0250787 A1* | 8/2021 | Kolding | H04L 47/24 |
| 2022/0061063 A1* | 2/2022 | Patel | H04W 72/1263 |
| 2022/0124654 A1* | 4/2022 | Takeda | H04W 56/00 |
| 2023/0242985 A1* | 8/2023 | Dor | C12Q 1/6883 |
| | | | 435/6.11 |

OTHER PUBLICATIONS

Qualcomm Incorporated, Benefits of periodicity and offset awareness of scheduling of TSN traffic, 3GPP TSG-RAN WG2 Meeting #104, R2-1816722, Nov. 12-16, 2018, pp. 1-7, Spokane, USA.
Nokia, Nokia Shanghai Bell, NR Support for TSN traffic patterns, 3GPP TSG-RAN WG2 Meeting #104, R2-1817270, Nov. 12-16, 2018, pp. 1-9, Spokane, USA.

* cited by examiner

| Periodicity Value (Integer [0,4999]) | Periodicity (milliseconds) |
|---|---|
| 0 | 0.1ms |
| 1 | 0.2ms |
| 2 | 0.3ms |
| ... | ... |
| 4998 | 499.9ms |
| 4999 | 500.0ms |

Figure 4A

| Time Offset Value (Integer [0, 102399]) | Time Offset (milliseconds) |
|---|---|
| 0 | 0ms |
| 1 | 0.1ms |
| 2 | 0.2ms |
| ... | ... |
| 102398 | 10239.8ms |
| 102399 | 10239.9ms |

Figure 4B

ENHANCED SCHEDULING OF TIME SENSITIVE NETWORKING

FIELD

The subject matter disclosed herein relates generally to wireless communication, and more particularly relates to an apparatus and method for enhanced scheduling of Time Sensitive Networking (TSN) in New Radio (NR) Industrial Internet of Things (IIoT).

BACKGROUND

The following abbreviations and acronyms are herewith defined, at least some of which are referred to within the following description.

Third Generation Partnership Project ("3GPP"), New Radio ("NR"), Evolved Node B ("eNB"), 5G Node B ("gNB"), Downlink ("DL"), Uplink ("UL"), Long Term Evolution ("LTE"), LTE Advanced ("LTE-A"), Radio Access Network ("RAN"), Evolved UMTS Terrestrial Radio Access Network ("E-UTRAN"), Acknowledgement ("ACK"), Negative Acknowledgement ("NACK"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Machine Type Communication ("MTC"), enhanced MTC ("eMTC"), Narrow Band Internet of Things ("NBIoT"), Internet of Things ("IoT"), Physical Downlink Control Channel ("PDCCH"), MTC Physical Downlink Control Channel ("MPDCCH"), Narrowband Physical Downlink Control Channel ("NPDCCH"), Physical Downlink Shared Channel ("PDSCH"), Time Division Duplex ("TDD"), Frequency-Division Multiplexing ("FDM"), Time-Division Multiplexing ("TDM"), Code-Division Multiplexing ("CDM"), User Entity/Equipment (remote device) ("UE"), Network Equipment ("NE"), Discontinuous Reception ("DRX"), Low Power Wide Area ("LPWA"), Paging Occasion ("PO"), System Information Block ("SIB"), Bandwidth Reduced Low Complexity/Coverage Enhancement ("BL/CE"), Identification ("ID"), Non-Access Stratum ("NAS"), Preconfigured Uplink Resource ("PUR"), Common Search Space ("CSS"), UE-specific Search Space ("USS"), Single-Carrier Frequency-Division Multiple Access ("SC-FDMA"), Transport Block Size ("TBS"), Modulation Coding Scheme ("MCS"), Downlink Control Indicator ("DCI"), Random Access Channel ("RACH"), Physical Random Access Channel ("PRACH"), Medium Access Control ("MAC"), Downlink Shared Channel ("DL-SCH"), Uplink Shared Channel ("UL-SCH"), Random Access Response ("RAR"), Radio Network Temporary Identifier ("RNTI"), Random Access Radio Network Temporary Identifier ("RA-RNTI"), Buffer Status Report ("BSR"), Integrated Access and Backhaul ("IAB"), millimeter Wave ("mmWave"), Mobile Termination ("MT"), Distributed Unit ("DU"), Central Unit ("CU"), gNB Central Unit ("gNB-CU"), gNB Distributed Units ("gNB-DUs"), gNB Central Unit Control Plane ("gNB-CU-CP"), gNB Central Unit User Plane ("gNB-CU-UP"), Radio Resource Control ("RRC"), Service Data Adaptation Protocol ("SDAP") and Packet Data Convergence Protocol ("PDCP"), Radio Link Control ("RLC"), Physical Layer ("PHY"), Next Generation Radio Access Network ("NG-RAN"), Scheduling Request ("SR"), End-to-End ("E2E"), MAC Control Element ("MAC CE"), Logical Channel ("LCH"), Logical Channel ID ("LCID"), Protocol Data Unit ("PDU"), Logical Channel Group ("LCG"), Physical Uplink Shared Channel ("PUSCH"), Industrial Internet of Things ("IIoT"), Semi-Persistent Scheduling ("SPS"), Configured Grant ("CG"), Quality of Service ("QoS"), Resource Elements ("RE"), Bandwidth Part ("BWP"), System Frame Number ("SFN"), Subcarrier Spacing ("SCS").

In wireless communication, such as a Third Generation Partnership Project (3GPP) mobile network, a wireless mobile network may provide a seamless wireless communication service to a wireless communication terminal having mobility. The wireless mobile network may be formed of a plurality of base stations. Each base station may operate one cell. A base station may perform wireless communication with a wireless communication terminal placed within a corresponding cell.

Radio technologies in cellular communications have evolved rapidly. The amount of traffic in cellular networks has experienced tremendous growth and expansion. Consequently, advancements in future networks are driven by the need to provide and account for massive connectivity and volume, expanded throughput and capacity, and ultra-low latency. Fifth generation (5G) access networks, which can also be referred to as New Radio (NR) access networks, are currently being developed and are expected to handle a very wide range of use cases and requirements.

Industrial Internet of Things (IIoT) technologies are poised to transform many industry verticals including healthcare, retail, automotive, and transport. Initially focusing on improving existing processes and augmented current infrastructure, IIoT will evolve to encompass next generation methods and procedures such as "teleoperation" (operation of a machine at a distance), tele-robotics, and other areas that rely upon interface and control of real objects by virtual objects.

5G New Radio (NR) access technology is a part of 5G Radio Access Network (RAN) architecture that is composed of LTE evolution and NR technology that will be operable from sub-1 GHz to 24+ GHz in a range of low band, mid band, and high band. For communication service providers, mmWave will bring both challenges and opportunities for general RAN infrastructure and in particular for private IIoT networks for industrial automation and mission critical services for enterprise across many industry verticals.

Communication in automation can be characterized by two main attributes: periodicity and determinism.

Periodicity means that a transmission interval is repeated. For example, a transmission occurs every 15 milliseconds (ms). Reasons for a periodic transmission can be the periodic update of a position or the repeated monitoring of a characteristic parameter. Most periodic intervals in communication for automation are rather short. The transmission is started once and continuous unless a stop command is provided.

Determinism refers to whether the delay between transmission of a message and receipt of the message at the destination address is stable (within bounds). Usually, communication is called deterministic if it is bounded by a given threshold for the latency/transmission time. In case of a periodic transmission, the variation of the interval is bounded.

Periodic deterministic communication is periodic with stringent requirements on timeliness and availability of the communication service. A transmission occurs every transfer interval.

SUMMARY

An apparatus and method for enhanced scheduling of Time Sensitive Networking (TSN) in NR IIoT are disclosed.

According to a first aspect, there is provided a method comprising: transmitting, by a remote device, a Time Sensitive Networking (TSN) traffic pattern to a base station; and configuring scheduling of TSN transmissions between the remote device and the base station based on a TSN traffic configuration; wherein the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Optionally, the periodicity value and the time offset value are represented with decimal fractions of millisecond.

Optionally, integer numbers are used for representing the periodicity configuration and time offset configuration in symbol level, where each integer value represents a time duration of a corresponding number of symbols.

Optionally, the TSN traffic configuration is a Semi-Persistent Scheduling/Configured Grant (SPS/CG) configuration.

Optionally, the method further comprises: adjusting the SPS/CG configuration for maintaining satisfaction of Quality of Service (QoS) requirements.

Optionally, the method further comprises: adjusting the SPS/CG configuration for subsequent TSN transmissions to compensate an accumulated error.

Optionally, the method further comprises: re-configuring scheduling of communication between the remote device and the base station based on adjusted SPS/CG configuration having an updated time offset configuration.

Optionally, the method further comprises: obtaining a time difference between a determined TSN traffic transmission time and a scheduled SPS/CG transmission time; comparing the time difference with a pre-configured threshold; and updating the time offset configuration upon detection of the time difference being larger than the pre-configured threshold.

Optionally, the method further comprises: receiving, by the remote device, an explicit signaling indicating adjustment of the SPS/CG configuration.

Optionally, the explicit signaling comprises: first information to indicate enabling and disabling of Downlink Control Information (DCI) monitoring; and second information to indicate shifting of the SPS/CG configuration in time domain.

Optionally, the method further comprises: obtaining a time difference between a determined TSN traffic transmission time and a scheduled SPS/CG transmission time; comparing the time difference with a pre-configured threshold; and monitoring, by the remote device, the explicit signaling indicating adjustment of the SPS/CG configuration upon detection of the time difference being larger than the pre-configured threshold.

Optionally, the method further comprises: adjusting the SPS/CG configuration for a specific TSN transmission with a modified transmission resource.

Optionally, the modified transmission resource is a transmission resource that is shifted in time domain to an available resource, fulfilling one or a combination of rules, the rules comprising: the available resource is not earlier than a packet arrival time of the remote device; the available resource is not later than a latency requirement; and an adjustment direction is selected to minimize an adjustment offset.

Optionally, the modified transmission resource is a transmission resource that is adjusted in frequency domain, fulfilling one or a combination of rules, the rules comprising: number of symbols in time domain is minimized; and number of effective resource elements (RE) in the modified transmission resource is equal to or larger than that in an initially scheduled transmission resource.

Optionally, the modified transmission resource is a transmission resource with a new Bandwidth Part (BWP) configuration.

Optionally, the new BWP configuration is applied to subsequent transmissions after the specific TSN transmission.

Optionally, the modified transmission resource is a transmission resource that is adjusted based on an explicit signaling having one or a combination of parameters, including: a time offset of the transmission resource; a time domain start position and length for the transmission resource; a frequency domain position and bandwidth for the transmission resource; and a BWP configuration index for the transmission resource.

Optionally, the method further comprises: detecting collisions between the specific TSN transmission without adjustment and non-usable symbols; detecting whether the specific TSN transmission without adjustment crosses a slot boundary; and monitoring, by the remote device, an explicit signaling indicating the modified transmission resource.

According to a second aspect, there is provided a method comprising: receiving, by a base station, a Time Sensitive Networking (TSN) traffic pattern from a remote device; and configuring scheduling of TSN transmissions between the remote device and the base station based on a TSN traffic configuration; wherein the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Optionally, the periodicity value and the time offset value are represented with decimal fractions of millisecond.

Optionally, integer numbers are used for representing the periodicity configuration and time offset configuration in symbol level, where each integer value represents a time duration of a corresponding number of symbols.

Optionally, the TSN traffic configuration is a Semi-Persistent Scheduling/Configured Grant (SPS/CG) configuration.

Optionally, the method further comprises: adjusting the SPS/CG configuration for maintaining satisfaction of Quality of Service (QoS) requirements.

Optionally, the method further comprises: adjusting the SPS/CG configuration for subsequent TSN transmissions to compensate an accumulated error.

Optionally, the method further comprises: re-configuring scheduling of communication between the remote device and the base station based on adjusted SPS/CG configuration having an updated time offset configuration.

Optionally, the method further comprises: obtaining a time difference between a determined TSN traffic transmission time and a scheduled SPS/CG transmission time; comparing the time difference with a pre-configured threshold; and updating the time offset configuration upon detection of the time difference being larger than the pre-configured threshold.

Optionally, the method further comprises: transmitting, by the base station, an explicit signaling indicating adjustment of the SPS/CG configuration.

Optionally, the explicit signaling comprises: first information to indicate enabling and disabling of Downlink Control Information (DCI) monitoring; and second information to indicate shifting of the SPS/CG configuration in time domain.

Optionally, the method further comprises: obtaining a time difference between a determined TSN traffic transmission time and a scheduled SPS/CG transmission time; comparing the time difference with a pre-configured threshold; and transmitting, by the base station, the explicit signaling indicating adjustment of the SPS/CG configuration upon detection of the time difference being larger than the pre-configured threshold.

Optionally, the method further comprises: adjusting the SPS/CG configuration for a specific TSN transmission with a modified transmission resource.

Optionally, the modified transmission resource is a transmission resource that is shifted in time domain to an available resource, fulfilling one or a combination of rules, the rules comprising: the available resource is not earlier than a packet arrival time of the remote device; the available resource is not later than a latency requirement; and an adjustment direction is selected to minimize an adjustment offset.

Optionally, the modified transmission resource is a transmission resource that is adjusted in frequency domain, fulfilling one or a combination of rules, the rules comprising: number of symbols in time domain is minimized; and number of effective resource elements (RE) in the modified transmission resource is equal to or larger than that in an initially scheduled transmission resource.

Optionally, the modified transmission resource is a transmission resource with a new Bandwidth Part (BWP) configuration.

Optionally, the new BWP configuration is applied to subsequent transmissions after the specific TSN transmission.

Optionally, the modified transmission resource is a transmission resource that is adjusted based on an explicit signaling having one or a combination of parameters, including: a time offset of the transmission resource; a time domain start position and length for the transmission resource; a frequency domain position and bandwidth for the transmission resource; and a BWP configuration index for the transmission resource.

Optionally, the method further comprises: detecting collisions between the specific TSN transmission without adjustment and non-usable symbols; detecting whether the specific TSN transmission without adjustment crosses a slot boundary; and transmitting, by the base station, an explicit signaling indicating the modified transmission resource.

According to a third aspect, there is provided an apparatus comprising: a transmitter that transmits a Time Sensitive Networking (TSN) traffic pattern to a base station; and a processor that configures scheduling of TSN transmissions between the apparatus and the base station based on a TSN traffic configuration; wherein the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Optionally, the periodicity value and the time offset value are represented with decimal fractions of millisecond.

Optionally, integer numbers are used for representing the periodicity configuration and time offset configuration in symbol level, where each integer value represents a time duration of a corresponding number of symbols.

Optionally, the TSN traffic configuration is a Semi-Persistent Scheduling/Configured Grant (SPS/CG) configuration.

Optionally, the processor further adjusts the SPS/CG configuration for maintaining satisfaction of Quality of Service (QoS) requirements.

Optionally, the processor further adjusts the SPS/CG configuration for subsequent TSN transmissions to compensate an accumulated error.

Optionally, the processor further re-configures scheduling of communication between the apparatus and the base station based on adjusted SPS/CG configuration having an updated time offset configuration.

Optionally, the processor further obtains a time difference between a determined TSN traffic transmission time and a scheduled SPS/CG transmission time; compares the time difference with a pre-configured threshold; and updates the time offset configuration upon detection of the time difference being larger than the pre-configured threshold.

Optionally, the apparatus further comprises: a receiver that receives an explicit signaling indicating adjustment of the SPS/CG configuration.

Optionally, the explicit signaling comprises: first information to indicate enabling and disabling of Downlink Control Information (DCI) monitoring; and second information to indicate shifting of the SPS/CG configuration in time domain.

Optionally, the processor further obtains a time difference between a determined TSN traffic transmission time and a scheduled SPS/CG transmission time; compares the time difference with a pre-configured threshold; and monitors the explicit signaling indicating adjustment of the SPS/CG configuration upon detection of the time difference being larger than the pre-configured threshold.

Optionally, the processor further adjusts the SPS/CG configuration for a specific TSN transmission with a modified transmission resource.

Optionally, the modified transmission resource is a transmission resource that is shifted in time domain to an available resource, fulfilling one or a combination of rules, the rules comprising: the available resource is not earlier than a packet arrival time of the apparatus; the available resource is not later than a latency requirement; and an adjustment direction is selected to minimize an adjustment offset.

Optionally, the modified transmission resource is a transmission resource that is adjusted in frequency domain, fulfilling one or a combination of rules, the rules comprising: number of symbols in time domain is minimized; and number of effective resource elements (RE) in the modified transmission resource is equal to or larger than that in an initially scheduled transmission resource.

Optionally, the modified transmission resource is a transmission resource with a new Bandwidth Part (BWP) configuration.

Optionally, the new BWP configuration is applied to subsequent transmissions after the specific TSN transmission.

Optionally, the modified transmission resource is a transmission resource that is adjusted based on an explicit signaling having one or a combination of parameters, including: a time offset of the transmission resource; a time domain start position and length for the transmission resource; a frequency domain position and bandwidth for the transmission resource; and a BWP configuration index for the transmission resource.

Optionally, the processor further detects collisions between the specific TSN transmission without adjustment and non-usable symbols; detects whether the specific TSN transmission without adjustment crosses a slot boundary; and monitors an explicit signaling indicating the modified transmission resource.

According to a fourth aspect, there is provided an apparatus comprising: a receiver that receives a Time Sensitive Networking (TSN) traffic pattern from a remote device; and configuring scheduling of TSN transmissions between the remote device and the apparatus based on a TSN traffic configuration; wherein the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Optionally, the periodicity value and the time offset value are represented with decimal fractions of millisecond.

Optionally, integer numbers are used for representing the periodicity configuration and time offset configuration in symbol level, where each integer value represents a time duration of a corresponding number of symbols.

Optionally, the TSN traffic configuration is a Semi-Persistent Scheduling/Configured Grant (SPS/CG) configuration.

Optionally, the processor further adjusts the SPS/CG configuration for maintaining satisfaction of Quality of Service (QoS) requirements.

Optionally, the processor further adjusts the SPS/CG configuration for subsequent TSN transmissions to compensate an accumulated error.

Optionally, the processor further re-configures scheduling of communication between the remote device and the apparatus based on adjusted SPS/CG configuration having an updated time offset configuration.

Optionally, the processor further obtains a time difference between a determined TSN traffic transmission time and a scheduled SPS/CG transmission time; compares the time difference with a pre-configured threshold; and updates the time offset configuration upon detection of the time difference being larger than the pre-configured threshold.

Optionally, the apparatus further comprises: a transmitter that transmits an explicit signaling indicating adjustment of the SPS/CG configuration.

Optionally, the explicit signaling comprises: first information to indicate enabling and disabling of Downlink Control Information (DCI) monitoring; and second information to indicate shifting of the SPS/CG configuration in time domain.

Optionally, the processor further obtains a time difference between a determined TSN traffic transmission time and a scheduled SPS/CG transmission time; and compares the time difference with a pre-configured threshold; wherein the transmitter transmits the explicit signaling indicating adjustment of the SPS/CG configuration upon detection of the time difference being larger than the pre-configured threshold.

Optionally, the processor further adjusts the SPS/CG configuration for a specific TSN transmission with a modified transmission resource.

Optionally, the modified transmission resource is a transmission resource that is shifted in time domain to an available resource, fulfilling one or a combination of rules, the rules comprising: the available resource is not earlier than a packet arrival time of the remote device; the available resource is not later than a latency requirement; and an adjustment direction is selected to minimize an adjustment offset.

Optionally, the modified transmission resource is a transmission resource that is adjusted in frequency domain, fulfilling one or a combination of rules, the rules comprising: number of symbols in time domain is minimized; and number of effective resource elements (RE) in the modified transmission resource is equal to or larger than that in an initially scheduled transmission resource.

Optionally, the modified transmission resource is a transmission resource with a new Bandwidth Part (BWP) configuration.

Optionally, the new BWP configuration is applied to subsequent transmissions after the specific TSN transmission.

Optionally, the modified transmission resource is a transmission resource that is adjusted based on an explicit signaling having one or a combination of parameters, including: a time offset of the transmission resource; a time domain start position and length for the transmission resource; a frequency domain position and bandwidth for the transmission resource; and a BWP configuration index for the transmission resource.

Optionally, the processor further detects collisions between the specific TSN transmission without adjustment and non-usable symbols; and detects whether the specific TSN transmission without adjustment crosses a slot boundary; and wherein the apparatus further comprises a transmitter that transmits an explicit signaling indicating the modified transmission resource.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 4A is a schematic diagram illustrating an example of a periodicity configuration using integer numbers for representation of the periodicity value in non-integer-millisecond steps;

FIG. 4B is a schematic diagram illustrating an example of a time offset configuration using integer numbers for representation of the time offset value in non-integer-millisecond steps;

DETAILED DESCRIPTION

Figure 1:
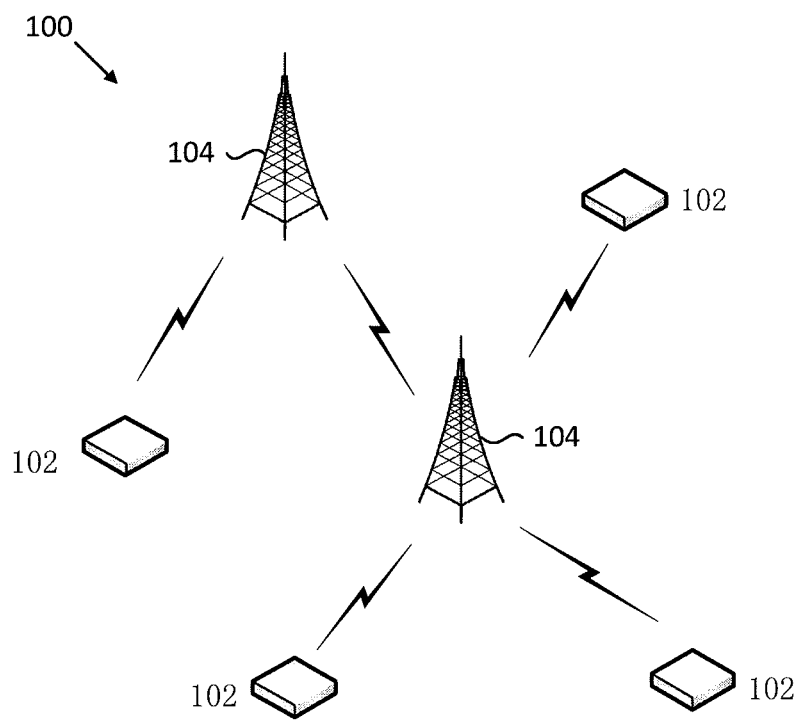
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 for an NR IIoT network. In one embodiment, the wireless communication system 100 may include user equipment (UEs) 102 and network equipment (NEs) 104. Even though a specific number of UEs 102 and NEs 104/106 is depicted in FIG. 1, one skilled in the art will recognize that any number of UEs 102 and NEs 104 may be included in the wireless communication system 100.

The user equipment (UEs) 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

A network equipment (NEs) 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced type of the network equipment 104, such as eNG and gNB.

The network equipment 104 may be distributed over a geographic region. The network equipment 104 is generally part of a radio access network that includes one or more controllers communicably coupled to one or more corresponding network equipment 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The network equipment 104 may serve a number of UEs 102 within a serving area, for example, a cell (or a cell sector) or more cells via a wireless communication link. The network equipment 104 transmits DL communication signals to serve the UEs 102 in the time, frequency, and/or spatial domain.

Figure 2:
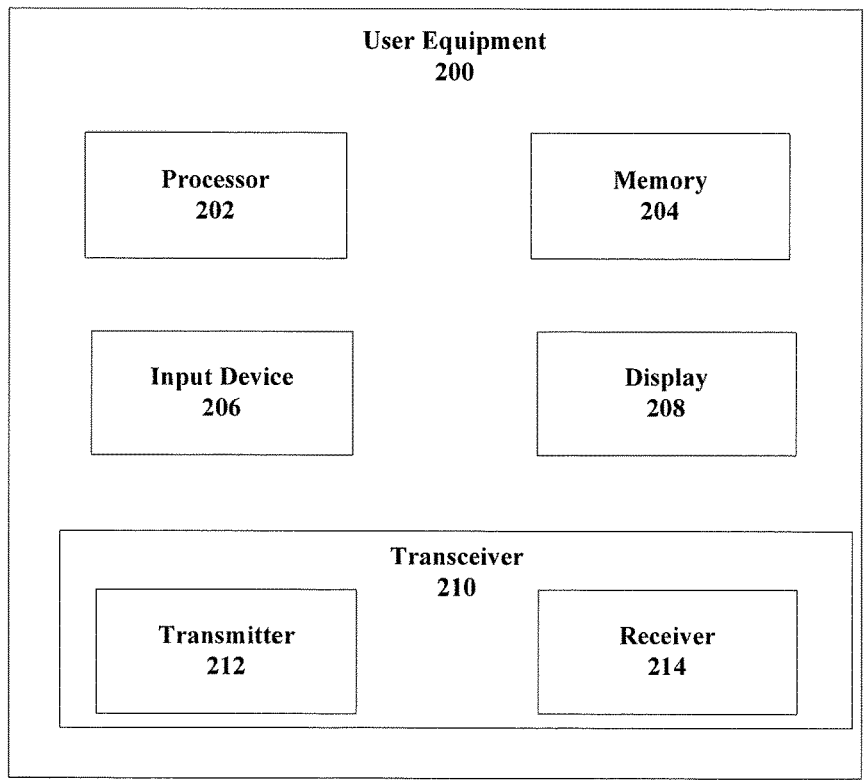
FIG. 2 is a schematic block diagram illustrating components of user equipment (UE) according to one embodiment.

FIG. 2 is a schematic block diagram illustrating components of user equipment (UE) according to one embodiment. The UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band from other transmitter 212 and receiver 214 pairs.

Figure 3:
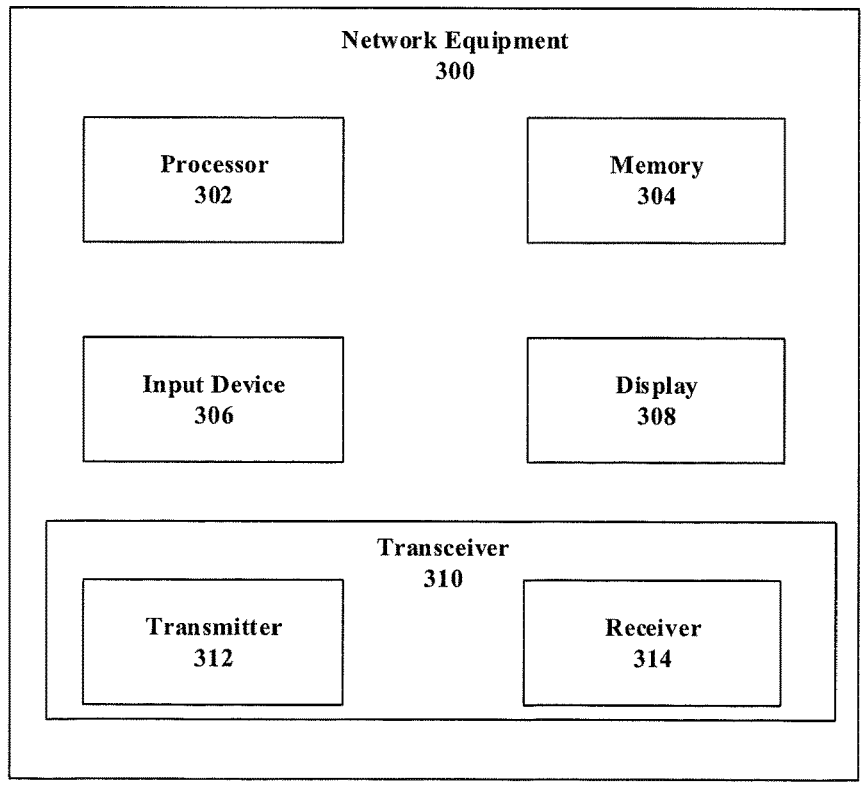
FIG. 3 is a schematic block diagram illustrating components of network equipment (NE) according to one embodiment.

FIG. 3 is a schematic block diagram illustrating components of network equipment (NE) according to one embodiment. The network equipment (NE) 300 may be an exemplary implementation of NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receiver 314 may receive a HARQ-ACK codebook from UE 200. As another example, the transmitter 312 may transmit the various configurations/data of NE 300.

The transceiver 310 may communicate simultaneously with a plurality of UEs 200. For example, the transmitter 312 may transmit DL communication signals to UE 200. As another example, the receiver 314 may simultaneously receive UL communication signals from UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, NE 300 may serve multiple cells and/or cell sectors, wherein the transceiver 310 includes a transmitter 312 and a receiver 314 for each cell or cell sector.

According to an example, the method for enhanced scheduling of Time Sensitive Networking (TSN) in NR IIoT may be performed in the following stages:
1) UE Reports TSN traffic pattern to gNB;
2) gNB configures SPS/CG configuration for TSN traffic;
3) Adjust SPS/CG configuration if necessary, e.g. if accumulated error between SPS/CG pattern and TSN traffic pattern has an impact on QoS of TSN traffic; and
4) Adjust specific SPS/CG transmission duration if necessary, e.g. if specific SPS/CG transmission duration collides with non-usable symbols, or crosses slot boundary.

Stage 1: UE Reports TSN Traffic Pattern to gNB

FIG. 4A is a schematic diagram illustrating an example of a periodicity configuration using integer numbers for representation of the periodicity value in non-integer-millisecond steps. FIG. 4B is a schematic diagram illustrating an example of a time offset configuration using integer numbers for representation of the time offset value in non-integer-millisecond steps.

TSN traffic is target for Factory Automation, Transport Industry, and Electrical Power Distribution, which all have very strict reliability and latency requirement. One kind of TSN traffic is periodic deterministic traffic, which is periodically transmitted and has very restricted latency bound (this means the traffic data needs to be correctly received in a predetermined time with a restricted latency bound). In some cases, the latency requirement is from 0.5 ms to 500 ms for different services, and maximum reliability requirement is 99.999999%.

TSN traffic has an arbitrary periodicity and offset, for example, there are periodicity values such as 0.833 ms or 16.667 ms, which are not integral multiples of symbols or slots or milliseconds in the NR system. Existing reporting mechanism does not support such arbitrary periodicity and offset report. For example, in NR RRC specification TS38.331, supported grant free periodicities are provided in a table with a limited number of options such as 1 ms, 2 ms, 4 ms . . . 640 ms. It does not support arbitrary periodicity configuration, such as 3 ms, 1.2 ms, etc. Further, assistance information from UE do not include TSN traffic patterns.

In one exemplary solution as shown in FIGS. 4A and 4B, the TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

In some cases, the requirement for the periodicity and offset is accurate to one decimal place in units of milliseconds. Thus the reported arbitrary periodicity and offset with an accuracy of one decimal place is enough. The UE may report TSN traffic periodicity and offset in decimal millisecond levels, for example:

i). periodicity may be represented with an integer of 0 to 4999, or integer (0, 4999), in which 0 means 0.1 ms, 1 means 0.2 ms, 2 means 0.3 ms . . . 4999 means 500.0 ms, as shown in FIG. 4A;

ii). offset may be represented with an integer of 0 to 102399, or integer (0, 102399), in which 0 means 0, 1 means 0.1 ms, 2 means 0.2 ms, 3 means 0.3 ms . . . 102399 means 10239.9 ms, as shown in FIG. 4B.

Such kind of report, or TSN traffic pattern, can be included in RRC signaling, for example, in the messages of UEAssistanceInformation and/or SidelinkUEInformation.

In some embodiments, the periodicity value and/or the time offset value are represented with numbers of time units, and each time unit is less than 1 ms. For example, each time unit may be defined as 0.1 ms, and a time offset value of 99 may indicate a time period of 9.9 ms (namely 99×0.1 ms).

In some other cases, the accuracy requirement may be higher than one decimal place in milliseconds. For example, if the accuracy requirement for periodicity is 0.01 ms, the integers for representing the periodicity may be 0 to 49999, in which 0 means 0.01 ms, 1 means 0.02 ms, 2 means 0.03 ms . . . 49999 means 500.0 ms. In another example, if the accuracy requirement for periodicity is 0.05 ms, the integers for representing the periodicity may be 0 to 9999, in which 0 means 0.05 ms, 1 means 0.10 ms, 2 means 0.15 ms . . . 9999 means 500.0 ms.

Stage 2: gNB Configures SPS/CG Configuration for TSN Traffic

After gNB knows the TSN traffic pattern, it needs to configure the UL resource with arbitrary periodicity and offset for TSN UEs. In some embodiments, the TSN traffic configuration is a Semi-Persistent Scheduling/Configured Grant (SPS/CG) configuration. The UE may receive a TSN traffic configuration or SPS/CG configuration from the gNB. The UL resource for the TSN traffic may be configured accordingly. In some other examples, the TSN traffic may comprise DL transmissions, and in this case, the gNB may not send the TSN traffic configuration to the UE, but simply configures the scheduling of DL TSN transmission of the gNB itself.

Upon receiving the report of TSN traffic pattern from the UE, the gNB converts the arbitrary TSN traffic pattern (periodicity & offset) to symbol-level based periodicity and offset, and configures the UE. In some embodiments, the gNB converts the arbitrary periodicity and offset to symbol-level periodicity configuration and offset configuration, and indicates to UE. It is also possible to convert the arbitrary periodicity and offset to slot or ms (subframe) level. In this case, the periodicity configuration and offset configuration may be integer numbers each representing a length of time corresponding to the numbers of slots or subframes.

The TSN traffic configuration may comprise a periodicity configuration and a time offset configuration, and the periodicity configuration and time offset configuration may be represented in numbers of symbols. Integer numbers are used for representing the periodicity configuration and time offset configuration in symbol level, where each integer value represents a time duration of a corresponding number of symbols.

Conversion from arbitrary pattern to symbol-level based configuration is implemented by gNB. If specified, the conversion is based on periodicity/offset value and symbol length, for example the symbol level periodicity/offset is equal toN multiply arbitrary periodicity/offset divided by symbol length, in which N is a factor.

Symbol level periodicity may be configured as, for example, integer (1, 112000), in which 112000 is calculated by 500 ms (maximum requirement)*16 (maximum slot number in one subframe)*14 (symbol number in one slot). Here, 1 means 1 symbol, 2 means 2 symbols . . . 112000 means 112000 symbols.

Symbol level offset may be configured as, for example, integer (0, 2293759), in which 2293759 is calculated by 10240 ms (maximum length in one NR SFN)*16 (maximum slot number in one subframe)*14 (symbol number in one slot)−1. Here 0 means 0 symbol, 1 means 1 symbol, . . . , 2293759 means 2293759 symbols.

Figure 5:
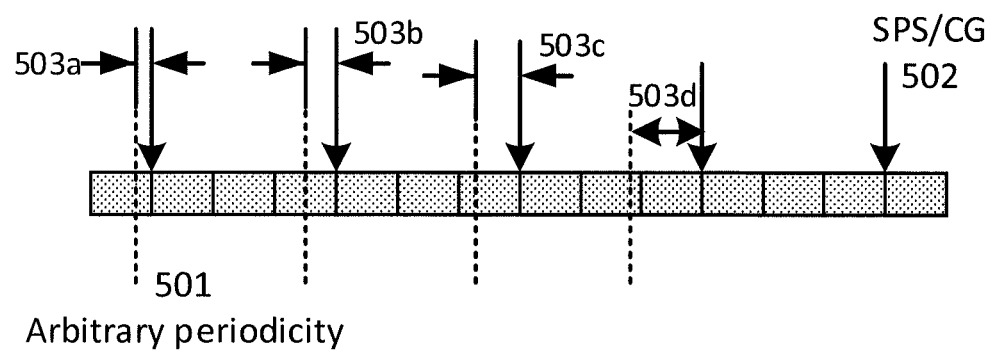
FIG. 5 is a schematic diagram illustrating accumulated errors due to inaccuracy of SPS/CG configuration in representing a Time Sensitive Networking (TSN) traffic pattern.

Stage 3: Adjust SPS/CG Configuration if Necessary, e.g. if Accumulated Error Between SPS/CG Pattern and TSN Traffic Pattern has an Impact on QoS of TSN Traffic FIG. 5 is a schematic diagram illustrating accumulated errors due to inaccuracy of the SPS/CG configuration in representing the TSN traffic pattern. When arbitrary periodicity is converted to symbol level periodicity, there will be an accumulated error, e.g. 503a, 503b, 503c and 503d, between the SPS/CG pattern or SPS/CG configuration 502, and arbitrary TSN traffic pattern 501, and such error will increase along with transmission times. The accumulate error may increase and become large enough to impact the QoS of TSN traffic. Then such kind of accumulate error needs to be corrected. The SPS/CG configuration may be adjusted for maintaining satisfaction of Quality of Service (QoS) requirements.

Scheduling of communication between the remote device and the base station may be re-configured based on the adjusted SPS/CG configuration having an updated time offset configuration.

In some embodiments, a solution may comprise: obtaining a time difference between a determined TSN traffic transmission time and a scheduled SPS/CG transmission time; comparing the time difference with a pre-configured threshold; and updating the time offset configuration upon detection of the time difference being larger than the pre-configured threshold. These operations may be performed by the gNB or the UE.

The determined TSN traffic transmission time refers to the required transmission time of the packet according to an accurate timing of the target system, for example, 0.833 ms. The scheduled SPS/CG transmission time refers to the actual transmission of the packet as schedule by the NR communication system, with a limited accuracy, for example, 0.9 ms.

Proposed Solution Option 1

It may provide a pre-defined adjustment threshold, and the adjustment may be performed implicitly. In some embodiments, gNB may configure a threshold to UE, for triggering the SPS/CG pattern adjustment. For example, gNB configures a threshold as 2 symbols, and then when the accumulate error is larger than 2 symbols, the adjustment for SPS/CG pattern is triggered. Alternatively, the threshold may be an absolute timing accuracy, for example, 0.1 ms. When the accumulate error is larger than 0.1 ms, the adjustment for SPS/CG pattern is triggered In some embodiments, the threshold configuration is per-service. One UE may be involved in multiple services of communication with the gNB, where requirement for accumulated error of one service may be different from the requirement for accumulated error of another service. Thus, different threshold values may be configured to different services of the UE.

In some embodiments, the threshold may be configured to UE by RRC signaling. After the adjustment is triggered, both gNB and UE will adjust SPS/CG pattern. The adjustment means that the SPS/CG pattern is shifted in time domain, while using the same frequency resource. The adjustment step can be equal to the threshold, e.g. 2 symbols in above example. The adjustment step value can be positive or negative, for example, 2 symbols means adjust 2 symbol to the later point, −2 symbols means adjust 2 symbol to the former point.

In some embodiments, gNB may send explicit signaling to further adjust SPS/CG pattern besides the implicit adjustment. For example, if resource collision is predicted to happen even after implicitly adjustment, gNB needs to send explicit signaling for further adjustment. The explicit signaling may be a DCI to indicate the time and frequency domain resource for adjusted pattern.

Proposed Solution Option 2

Explicit adjustment may be performed by gNB using DCI to indicate SPS/CG pattern adjustment. The explicit signaling may comprise:
  i). first information to indicate enabling and disabling of Downlink Control Information (DCI) monitoring; and
  ii). second information to indicate shifting of the SPS/CG configuration in time domain.

For type 1 UL configured grant, new UE behaviors are proposed, i.e., monitoring PDCCH for adjustment DCI, and the monitoring for adjustment DCI is restricted to following cases. gNB may use 1 bit for specific service in RRC signaling to indicate UE whether UE needs to monitor adjustment DCI for specific service. UE will monitor DCI for specific service or SPS/CG configuration if the above bit is set to TRUE.

For type 2 configured grant, or SPS, one alternative is to add one new field in DCI to indicate the number of symbols that the corresponding SPS/CG pattern is shifted. Another alternative is to transmit the activation DCI again and the activation DCI implicitly shifts the starting position of the existing SPS/CG configuration.

In some embodiments, the UE may not monitor the DCI for explicit signaling all the time. It may monitor the explicit signaling only when it is detected that certain conditions are satisfied. For example, it may first obtain a time difference between a determined TSN traffic transmission time and a scheduled SPS/CG transmission time; compare the time difference with a pre-configured threshold; and start monitoring the explicit signaling indicating adjustment of the SPS/CG configuration upon detection of the time difference being larger than the pre-configured threshold.

Figure 6:
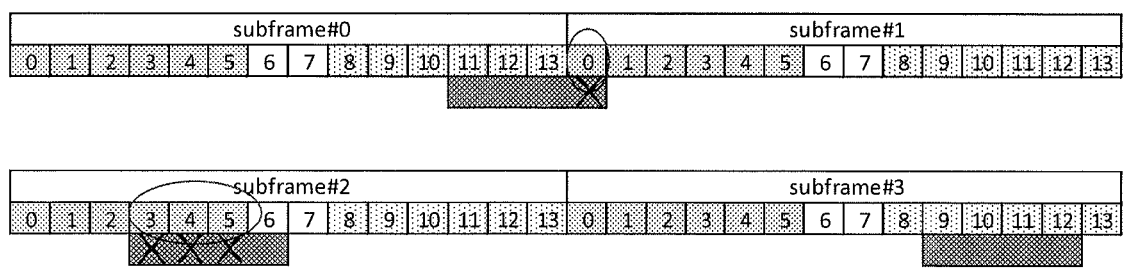
FIG. 6 is a schematic diagram illustrating collisions of UL transmission of TSN traffic with DL symbols.

Stage 4: Adjust Specific SPS/CG Transmission Duration if Necessary, e.g. if Specific SPS/CG Transmission Duration Collides with Non-Usable Symbols, or Crosses Slot Boundary FIG. 6 is a schematic diagram illustrating collisions of UL transmission of TSN traffic with DL symbol. SPS/CG pattern for TSN traffic may collide with non-usable symbol because of NR TDD frame structure. For example, UL CG pattern may collide with DL symbol. In legacy NR system, such kind of collision will abandon UL transmission and wait for next opportunity. However, this does not work for TSN traffic because of very high latency requirement.

In this example, UL transmission collides with DL symbol, which is non-usable symbol. In FIG. 6, symbols 0, 1, 2, 3, 4, 5 are DL symbols, symbols 6, 7 are flexible symbols, and symbols 8, 9, 10, 11, 12, 13 are UL symbols. UL transmission is colliding with DL symbol 0 in subframe #1, and DL symbols 3, 4, 5 in subframe #2.

Figure 7A:
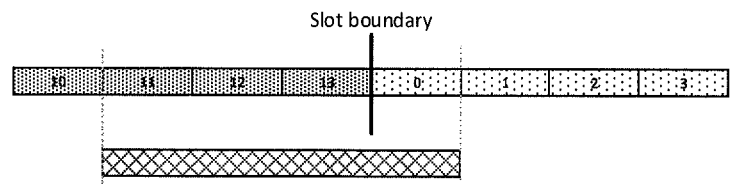
FIG. 7A is a schematic diagram illustrating a TSN transmission resource across a slot boundary.
Figure 7B:
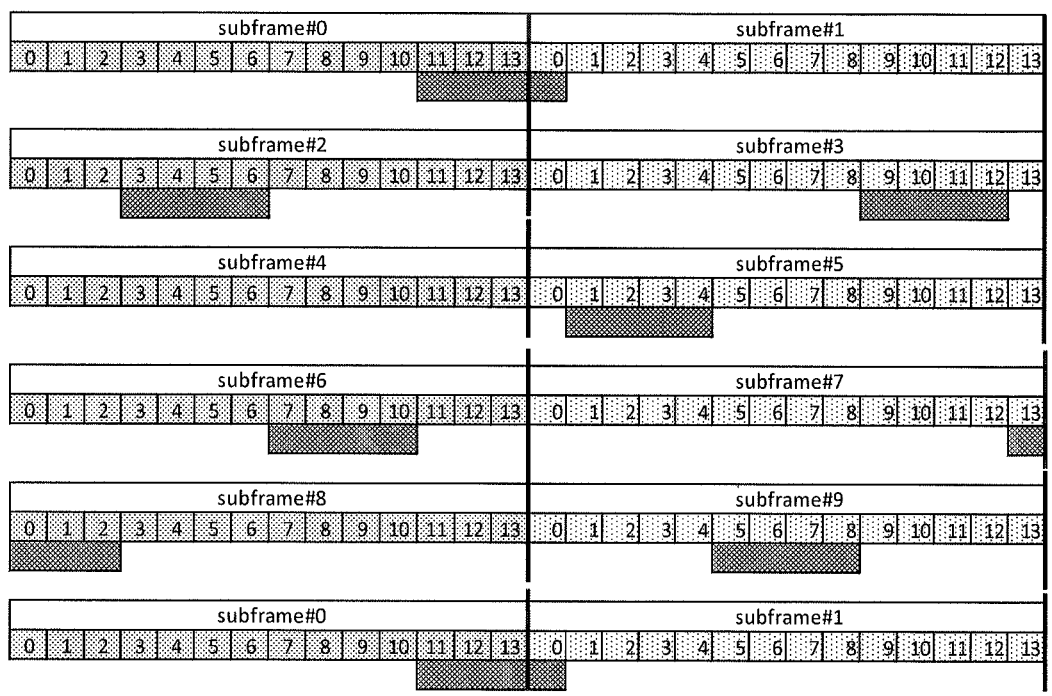
FIG. 7B is a schematic diagram illustrating multiple occurrences of resources crossing slot boundary for an SPS/CG configuration.

FIG. 7A is a schematic diagram illustrating a TSN transmission resource across a slot boundary. FIG. 7B is a schematic diagram illustrating multiple occurrences of resources crossing slot boundary for an SPS/CG configuration. The SPS/CG pattern for TSN traffic may cross the slot boundary because the TSN traffic periodicity and offset may be a time period of non-integer-milliseconds, and slot boundary occurs between subframes that are at timing of integer-milliseconds. This, namely cross slot boundary transmission, is not allowed by NR system.

As shown in FIG. 7B, when the arbitrary TSN traffic periodicity and time offset are supported, this issue occurs for some transmission opportunities. For example, when the TSN traffic duration is 4 symbols, the starting point is frame #0 subframe #0 symbol #11, and the periodicity is 20 symbols, then for every 10 ms, there are two collisions with slot boundary: one crossing the slot boundary between subframe #0 and subframe #1, and the other crossing the slot boundary between subframe #7 and subframe #8.

If any one of the collisions shown in FIGS. 6 and 7 occurs, adjustment of the specific SPS/CG transmission duration, or the SPS/CG configuration for the specific TSN transmission with a modified transmission resource, is required.

Proposed Solution Option A

It may implicitly adjust transmission duration in the time domain with rules for the specific transmission duration.

Figure 8A:
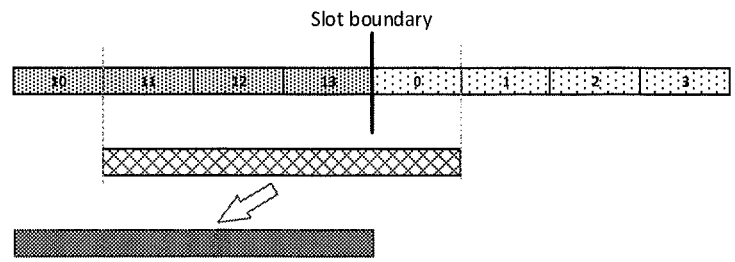
FIG. 8A is a schematic diagram illustrating an adjustment of the transmission resource in time domain.

FIG. 8A is a schematic diagram illustrating an adjustment of the transmission resource in the time domain. In this example, the modified transmission resource may be a transmission resource that is shifted in the time domain to an available resource, fulfilling one or a combination of rules, the rules comprising:
  i). the available resource is not earlier than a packet arrival time of the remote device;
  ii). the available resource is not later than a latency requirement; and
  iii). an adjustment direction is selected to minimize an adjustment offset.

With the above rules, the QoS can be maintained to the maximum extent.

Proposed Solution Option B

It may implicitly adjust transmission in the frequency domain with rules for the specific transmission duration.

Figure 8B:
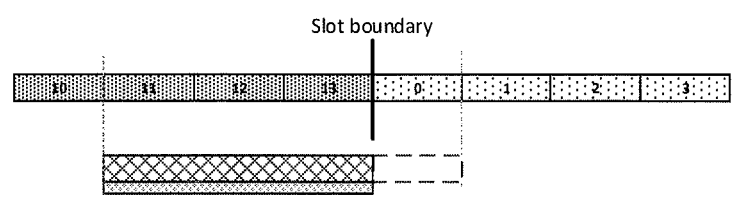
FIG. 8B is a schematic diagram illustrating an adjustment of the transmission resource in frequency domain.

FIG. 8B is a schematic diagram illustrating an adjustment of the transmission resource in the frequency domain. The modified transmission resource may be a transmission resource that is adjusted in the frequency domain, fulfilling one or a combination of rules, the rules comprising:

i). number of symbols in time domain is minimized; and ii). number of effective resource elements (RE) in the modified transmission resource is equal to or larger than that in an initially scheduled transmission resource.

As shown in FIG. 8B, for example, the transmission in the time domain has 4 symbols, and in the frequency domain has two PRBs. There is one symbol in the time domain that needs to be converted, which may be in collision with a non-usable symbol or crossing a slot boundary. Assuming there are 12 resource elements (REs) in each PRB and symbol, then there are 24 effective REs for the symbol to be converted, namely 12×2 PRBs×1 symbol. When this symbol is converted to the frequency domain, i.e. with an additional PRB, then there are 36 REs for this additional PRB in 3 symbols, namely 12×1 PRB×3 symbols. Thus after conversion, the transmission duration resource is 3 symbols in the time domain and 3 PRBs in the frequency domain.

Proposed Solution Option C

It may dynamically change the Bandwidth Part (BWP) configurations for the specific transmission duration.

Figure 8C:
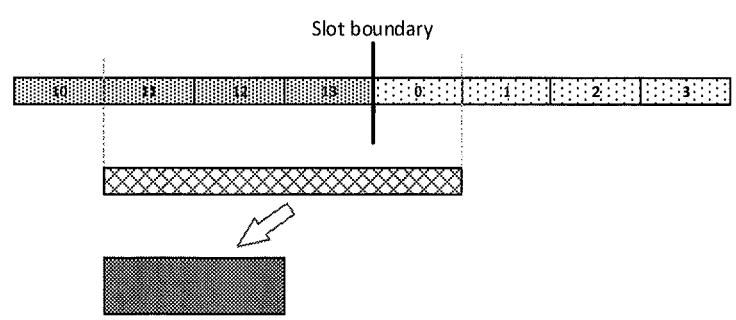
FIG. 8C is a schematic diagram illustrating an adjustment of the transmission resource with change of BWP configuration.

FIG. 8C is a schematic diagram illustrating an adjustment of the transmission resource with change of BWP configuration. The modified transmission resource is a transmission resource with a new Bandwidth Part (BWP) configuration. In some embodiments, the new BWP configuration is applied to subsequent transmissions after the specific TSN transmission.

When the specific transmission duration collides with non-usable symbols or a slot boundary, the transmission is adjusted to another configured BWP (which may be in the same or different frequency position), so that the transmission can be reduced in the time domain and extended in the frequency domain.

Assuming, for example, UE is configured by gNB with two BWPs which are BWP #1 and BWP #2, and BWP #1 has Subcarrier Spacing (SCS) of 15 kHz, and BWP #2 has SCS of 30 kHz. At the beginning, UE is activated with BWP #1 to transmit SPS/CG, and when collision happens for the specific transmission duration, such transmission duration is dynamically changed to BWP #2. Then if the transmission duration has 4 symbols in the time domain and 2 PRBs (360 kHz frequency bandwidth) in the frequency domain with BWP #1, after changing to BWP #2, such transmission duration is converted to 2 symbols in the time domain and 2 PRBS (720 kHz frequency bandwidth) in the frequency domain. That is, the modified transmission resource is two times in the frequency domain and ½ in the time domain as compared to the originally scheduled transmission resource.

Then collision in this case is then avoided. After this transmission duration completes, UE can change back to BWP #1, or UE can always use BWP #2 for following transmissions.

This BWP changing can be done implicitly between UE and gNB given that both sides follow the same rules in the collision handling. Alternatively, the BWP changing can be done explicitly based on DCI, i.e. when gNB predicts that the collision will happen and then sends DCI for BWP changing.

Proposed Solution Option D

It may use explicitly signaling, e.g. DCI, to adjust collide transmission durations. The modified transmission resource is a transmission resource that is adjusted based on an explicit signaling having one or a combination of parameters, including:

i). a time offset of the transmission resource;

ii). a time domain start position and length for the transmission resource;

iii). a frequency domain position and bandwidth for the transmission resource; and iv). a BWP configuration index for the transmission resource.

In some embodiments, the UE may only monitor possible DCI before expected-collision-transmission. The UE will monitor adjustment DCI when collisions is expected to occur between specific transmission duration and non-usable symbol(s), or transmission duration is expected to cross a slot boundary.

In this case, the UE may first detect collisions between the specific TSN transmission without adjustment and non-usable symbols; and also detect whether the specific TSN transmission without adjustment crosses a slot boundary. The UE then monitors an explicit signaling indicating the modified transmission resource if any one of the above cases is detected.

Figure 9:
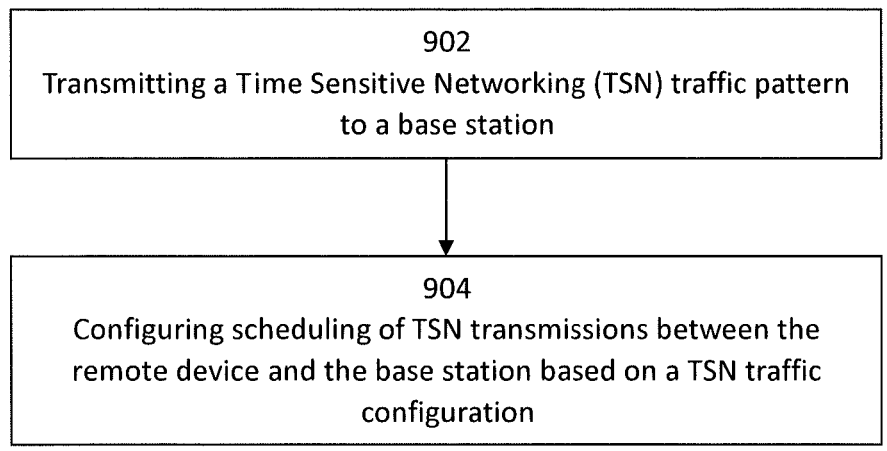
FIG. 9 is a flow diagram illustrating steps for an enhanced scheduling of Time Sensitive Networking (TSN) in NR IIoT by a remote device.

FIG. 9 is a flow diagram illustrating steps for an enhanced scheduling of Time Sensitive Networking (TSN) in NR IIoT by a remote device.

In step 902, the remote device transmits a Time Sensitive Networking (TSN) traffic pattern to a base station.

In step 904, scheduling of TSN transmissions between the remote device and the base station is configured based on a TSN traffic configuration.

The TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Figure 10:
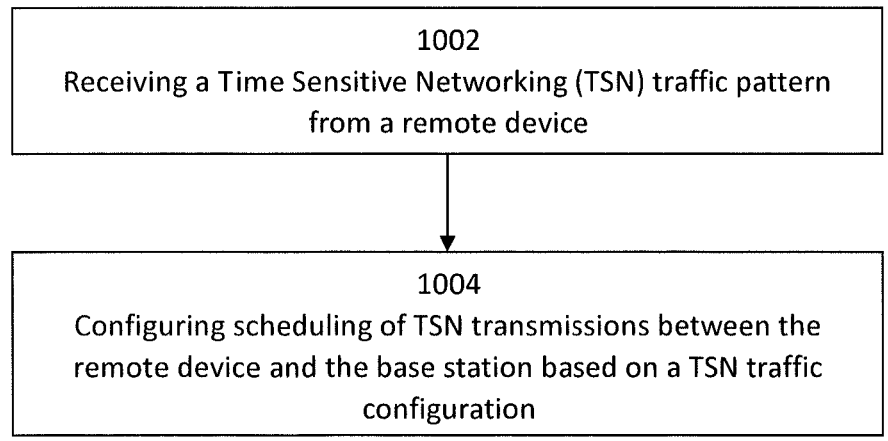
FIG. 10 is a flow diagram illustrating steps for an enhanced scheduling of Time Sensitive Networking (TSN) in NR IIoT by a base station.

FIG. 10 is a flow diagram illustrating steps for an enhanced scheduling of Time Sensitive Networking (TSN) in NR IIoT by a base station.

In step 1002, the base station receives a Time Sensitive Networking (TSN) traffic pattern from a remote device.

In step 1004, scheduling of TSN transmissions between the remote device and the base station is configured based on a TSN traffic configuration.

The TSN traffic pattern comprises a periodicity value and a time offset value, and the periodicity value and the time offset value are represented in lengths of time; integer numbers are used for representation of the periodicity value and the time offset value, the integer numbers represent time periods in non-integer-millisecond steps; and the TSN traffic configuration comprises a periodicity configuration and a time offset configuration.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a transmitter that transmits a time sensitive networking traffic pattern to a base station; and
a processor that configures scheduling of time sensitive networking transmissions between the apparatus and the base station based on a time sensitive networking traffic configuration;
wherein:
the time sensitive networking traffic pattern comprises a periodicity value and a time offset value, and the periodicity value and the time offset value are represented in lengths of time;
integer numbers are used for representation of the periodicity value and the time offset value, the integer numbers represent time periods in non-integer-millisecond steps; and
the time sensitive networking traffic configuration comprises a periodicity configuration and a time offset configuration.

2. The apparatus of claim 1, wherein the periodicity value and the time offset value are represented with decimal fractions of millisecond.

3. The apparatus of claim 1, wherein integer numbers are used for representing the periodicity configuration and time offset configuration in symbol level, where each integer value represents a time duration of a corresponding number of symbols.

4. The apparatus of claim 1, wherein the time sensitive networking traffic configuration is a semi-persistent scheduling and configured grant configuration.

5. The apparatus of claim 4, wherein the processor further adjusts the semi-persistent scheduling and configured grant configuration for maintaining satisfaction of quality of service requirements.

6. The apparatus of claim 4, wherein the processor further adjusts the semi-persistent scheduling and configured grant configuration for subsequent time sensitive networking transmissions to compensate for an accumulated error.

7. The apparatus of claim 4, wherein the processor further re-configures scheduling of communication between the apparatus and the base station based on adjusted semi-persistent scheduling and configured grant configuration having an updated time offset configuration.

8. The apparatus of claim 7, wherein the processor further:
obtains a time difference between a determined time sensitive networking traffic transmission time and a scheduled semi-persistent scheduling and configured grant transmission time;
compares the time difference with a pre-configured threshold; and
updates the time offset configuration upon detection of the time difference being larger than the pre-configured threshold.

9. The apparatus of claim 1, wherein the processor further adjusts the semi-persistent scheduling and configured grant configuration for a specific time sensitive networking transmission with a modified transmission resource.

10. The apparatus of claim 9, wherein the modified transmission resource is a transmission resource that is shifted in a time domain to an available resource fulfilling one or a combination of rules, the rules comprising:
the available resource is not earlier than a packet arrival time of the apparatus;
the available resource is not later than a latency requirement; and
an adjustment direction is selected to minimize an adjustment offset.

11. An apparatus comprising:
a receiver that receives a time sensitive networking traffic pattern from a remote device; and
configuring scheduling of time sensitive networking transmissions between the remote device and the apparatus based on a time sensitive networking traffic configuration;
wherein:
the time sensitive networking traffic pattern comprises a periodicity value and a time offset value, and the periodicity value and the time offset value are represented in lengths of time;
integer numbers are used for representation of the periodicity value and the time offset value, the integer numbers represent time periods in non-integer-millisecond steps; and
the time sensitive networking traffic configuration comprises a periodicity configuration and a time offset configuration.

12. The apparatus of claim 11, wherein the periodicity value and the time offset value are represented with decimal fractions of millisecond.

13. The apparatus of claim 11, wherein integer numbers are used for representing the periodicity configuration and time offset configuration in symbol level, where each integer value represents a time duration of a corresponding number of symbols.

14. The apparatus of claim 11, wherein the time sensitive networking traffic configuration is a semi-persistent scheduling and configured grant configuration.

15. The apparatus of claim 14, wherein the processor further adjusts the semi-persistent scheduling and configured grant configuration for maintaining satisfaction of quality of service.

16. The apparatus of claim 14, wherein the processor further adjusts the semi-persistent scheduling and configured grant configuration for subsequent time sensitive networking transmissions to compensate for an accumulated error.

17. The apparatus of claim 14, wherein the processor further re-configures scheduling of communication between the remote device and the apparatus based on adjusted semi-persistent scheduling and configured grant configuration having an updated time offset configuration.

18. The apparatus of claim 17, wherein the processor further:
obtains a time difference between a determined time sensitive networking traffic transmission time and a scheduled semi-persistent scheduling and configured grant transmission time;
compares the time difference with a pre-configured threshold; and
updates the time offset configuration upon detection of the time difference being larger than the pre-configured threshold.

19. The apparatus of claim 11, wherein the processor further adjusts the semi-persistent scheduling and configured grant configuration for a specific time sensitive networking transmission with a modified transmission resource.

20. The apparatus of claim 19, wherein the modified transmission resource is a transmission resource that is shifted in a time domain to an available resource fulfilling one or a combination of rules, the rules comprising:
- the available resource is not earlier than a packet arrival time of the remote device;
- the available resource is not later than a latency requirement; and
- an adjustment direction is selected to minimize an adjustment offset.

* * * * *